Oct. 29, 1968  G. W. FOOTE  3,408,111
VENTILATING WHEEL BALANCER
Filed Sept. 6, 1966
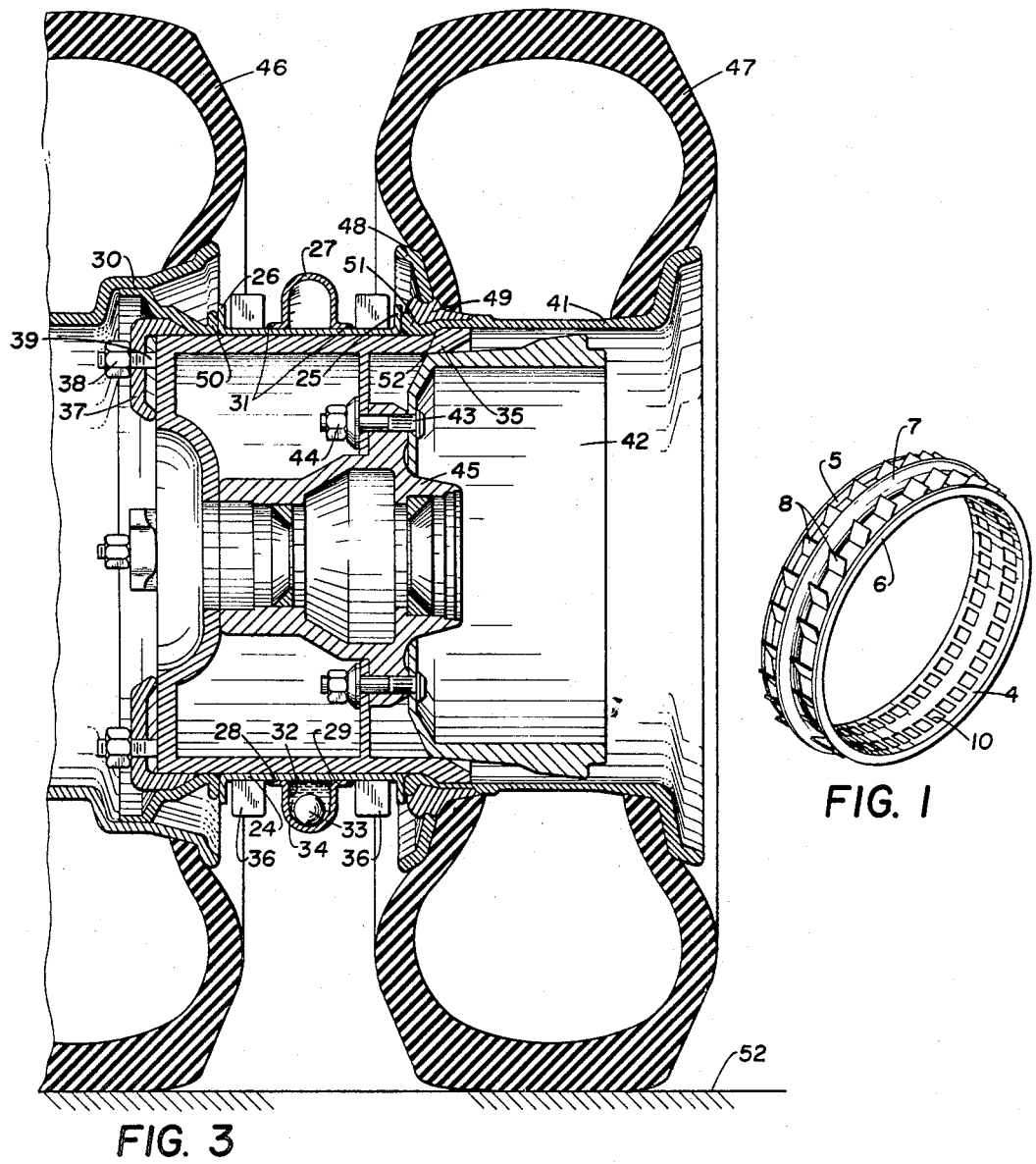
FIG. 3
FIG. 1
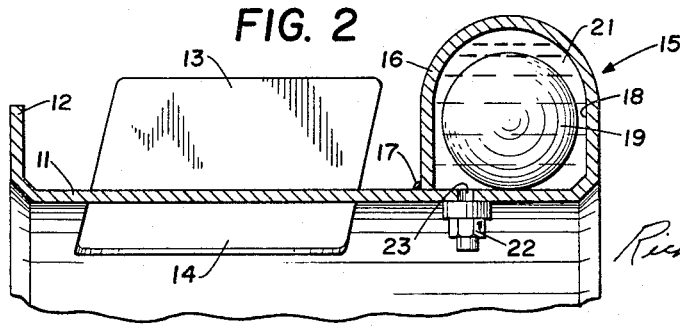
FIG. 2
INVENTOR
G. WARD FOOTE
ATTORNEY – # United States Patent Office 3,408,111
Patented Oct. 29, 1968

3,408,111
VENTILATING WHEEL BALANCER
George Ward Foote, Atlanta, Ga., assignor to AWB Manufacturing, Inc., Stafford, Kans., a corporation of Kansas
Filed Sept. 6, 1966, Ser. No. 577,333
11 Claims. (Cl. 301—5)

This invention relates to wheel balancers, and more particularly, but not by way of limitation, to ventilating wheel balancers for use between dual mounted tires on trucks and the like.

Dynamic wheel balancers utilized within the past several years typically have taken the form of an annular casing enclosing a plurality of balls or other balancing elements, together with a quantity of oil or other hydraulic fluid. With the balancer concentrically mounted on a wheel, the balls position themselves on rotation substantially diametrically opposed to the mass tending to cause imbalance of the wheel. The effect of the positioning of the balls is thus to move the center of mass of the wheel into coincidence with the center of rotation and thus eliminate vibration and uneven operation of the wheel. The present invention provides a dynamic wheel balancer for use with a dual tire unit which incorporates means for increasing the circulation of air between the tires, thus reducing the temperature of the tires for prolonging their useful life.

The invention may be generally described as a ventilating wheel balancer which includes a circular band having a plurality of vanes fixed thereto and spaced about the periphery thereof. A hollow circular ring is secured to the band about its periphery and carries a plurality of balls having a diameter slightly less than the maximum diameter that may be accommodated by the ring. A dampening fluid is also carried by the ring for dampening movement of the balls. To be more particular, reference is made to the drawings, in which:

FIGURE 1 is a perspective view of one embodiment of the invention;

FIGURE 2 is an elevational view in cross section of another embodiment of the invention; and FIGURE 3 is an elevational view in cross section of yet another embodiment of the invention mounted on a dual tired unit.

In FIGURE 1, a circular band 4 is provided at the edges with upstanding lip portions 5 and 6 which receive therebetween a hollow circular ring 7 of plastic or the like. On either side of ring 7 is a row of vanes 8 which are punched from the periphery of band 4 to form an exterior angle of approximately 135° therewith thereby forming a plurality of apertures 10. Vanes 8, as illustrated, are disposed uniformly about the periphery of band 4 to provide a relatively balanced assembly having its center of gravity at the center of the ring 4. Ring 7 is fixed relative to band 4 by glue or the like and carries a plurality of balls and a dampening fluid such as illustrated in FIGURE 2, to which reference is now made.

In FIGURE 2, circular band 11 is provided at one edge with flange 12 adjacent to which are a plurality of vanes only one of which is illustrated. Vanes 13 are punched from band 11, as in FIGURE 1, thereby forming a plurality of apertures 14 in band 11, only one of which is illustrated. The opposite edge of band 11 is rolled to form a circular ring 15, generally U-shaped in cross section. Leg 16 of ring 15 is secured to band 11 by any conventional means, such as weldment 17, to provide a fluid-tight chamber 18 within which is carried a plurality of balls 19. Balls 19 preferably have a diameter slightly less than the diameter of the largest balls which chamber 18 will accommodate. Chamber 18, however, may be filled with shot or other type weight means common to the art. Also contained in chamber 18 is a dampening fluid 21 used to reduce noise and increase the over-all efficiency of the unit. Hydraulic fluid such as normally employed in brake systems may be conveniently used, as may conventional transmission fluid. The dampening fluid is introduced into chamber 18 through a conventional filler plug 22 secured to the inner periphery of band 11 in registering relationship with aperture 23 communicating with chamber 18.

With reference to FIGURE 3, a band 24, channel-shaped in cross section is provided with lips 25 and 26 intermediate which is carried a ring 27. Ring 27 is generally U-shaped in cross section, and the legs 28 and 29 of ring 27 are secured to band 24 by any suitable means such as weldments 31. Ring 27 forms a chamber 32 which houses a plurality of steel balls 33 and a suitable dampening fluid 34. Band 24 is concentrically mounted on a wheel 35 so that vanes 36 punched in band 24, like vanes 8 illustrated in FIGURE 1, are upstanding from the surface of wheel 35. Wheel 35 has mounted thereto an outer rim 30 which is secured in place by clamps 37 and nuts 38 which engage bolts 39 extending from wheel 35. Wheel 35 also carries an inner rim 41 which is held to wheel 35 by force, exerted through circular band 24 and outer rim 30 as applied by clamp 37 and nut 38 engaging bolt 39, against the 28° mounting bevel. Brake drum 43 is also secured to wheel 35 by studs 43 and nuts 44. Outer rim 30 has mounted thereon a tubeless tire 46 and inner rim 41 is shown with a conventional tire 47 which is retained at its inner edge by side ring 48 and lock ring 49. Inner rim 41 may also be constructed with a similar base but equipped with a single combination side and lock ring. Bearing hub 45 is cast into and is an integral part of wheel 35 which is commonly known to those skilled in the art as a hub integral cast spoke, demountable wheel.

Cross section drawing, FIGURE 3, is a composite of a dual tired assembly mounted on a conventional cast spoke wheel 35 to indicate that either a drop center rim 30 with tubeless tire 46 or a flat base rim 41, with conventional tire 47 may be incorporated in the same assembly. Either tire and rim assembly will function in the inner or outer position or the dual assembly may be made up with like rims in inner and outer position providing the diameters of the respective tires are within accepted tolerance.

Band 24 is secured from rotation relative to wheel 35 by frictional abutment with the center lip 50 of rim 36 and the outer lip 51 of rim 41.

During operation, the temperature of tires 46 and 47 will rise due to frictional engagement with the road surface 52. Vanes 36 will promote the circulation of air between tires 46 and 47 thereby carrying heat from tires 46 and 47 to prolong the useful life of the tires. The dynamic wheel balancer portion formed by ring 27, balls 33, and dampening fluid 34 will function in a manner described above to serve as a balancing unit to additionally prolong the life of tires 46 and 47. The embodiment of the invention illustrated in FIGURE 3 also carries a filler plug, not illustrated, such as filler plug 22 illustrated in FIGURE 2 to permit addition of fluid to chamber 32. Any of the embodiments of the invention illustrated in FIGURES 1, 2 and 3 may be used with the wheel assembly illustrated in FIGURE 3, and it will be obvious to those skilled in the art after a reading of the above that the dimensions of bands 4, 11, and 24 may be varied to permit installation on dual wheel assemblies of different dimensions. While rather specific terms have been used to describe several embodiments of the invention, they are

What is claimed is:

1. A ventilating dual wheel spacer band and wheel balancer which comprises:
   (a) a circular band;
   (b) a plurality of vanes fixed to and spaced about the periphery of said band;
   (c) a hollow circular ring secured to said band about its periphery;
   (d) weight means movable in response to centrifugal force carried within said ring; and
   (e) a damping fluid carried by said ring for damping the movement of said weight means.

2. The balancer of claim 1, wherein said spacer band is channel-shaped in cross section and dimensioned to be received between the inner edges of rims on a dual tired vehicle.

3. The balancer of claim 1, wherein said vanes are punched from the periphery of said band and form an exterior angle of about 135° with the periphery thereof.

4. The device of claim 1, wherein said ring is U-shaped in cross section.

5. The device of claim 1, wherein one edge of said band is rolled to form said ring within which weight means and damping fluid are contained.

6. The device of claim 1, wherein said band is provided with an aperture that communicates with the interior of said hollow ring for introducing said damping fluid into the ring, and said device includes a plug adapted to be fixedly received within said aperture.

7. The device of claim 1, wherein a row of vanes lie adjacent each edge of said band and said ring is fixed to said band between said rows of vanes.

8. The device of claim 1 wherein said band is adapted to be concentrically and bindingly received about the wheel of a vehicle.

9. The device of claim 1, wherein said vanes are rectilinear.

10. The device of claim 1, wherein said vanes are punched from the periphery of said band, said ring is U-shaped in cross section, said band is provided with an aperture that communicates with the interior of said hollow ring for introducing said damping fluid into the ring, and said device includes a plug adapted to be fixedly received within said aperture.

11. A spacer band and wheel balancer for attachment between dual rims having axially facing abutment shoulders comprising:
   (a) a circular spacer rim between the abutment shoulders of the dual rims,
   (b) a hollow balancing tube having movable weights within, and
   (c) means for mounting said balancing tube on the periphery of said spacer rim.

References Cited
UNITED STATES PATENTS

| | | | |
|---|---|---|---|
| 2,737,420 | 3/1956 | Wilborn | 301—5 |
| 3,168,348 | 2/1965 | Fleming | 301—13 X |
| 3,191,997 | 6/1965 | Colvert | 301—5 |
| 3,314,726 | 4/1967 | Rehnborg | 301—5 |

RICHARD J. JOHNSON, *Primary Examiner.*